Patented June 17, 1952

2,600,419

UNITED STATES PATENT OFFICE 2,600,419

OIL-SOLUBLE ALLYL COPOLYMERS

Harry T. Neher, Bristol, and La Verne N. Bauer and William L. Van Horne, Philadelphia, Pa., assignors to Rohm & Haas Company, Philadelphia, Pa., a corporation of Delaware No Drawing. Application July 15, 1949,
Serial No. 105,043

4 Claims. (Cl. 260—85.7)

This invention relates to copolymers of (a) esters from allyl and/or methallyl alcohol and aliphatic monocarboxylic acids of at least sixteen carbon atoms and (b) esters from allyl and/or methallyl alcohol and aliphatic monocarboxylic acids having four to fourteen carbon atoms. It deals, furthermore, with the preparation of these copolymers in liquid hydrocarbons and with compositions comprising these copolymers dissolved in wax-containing hydrocarbons, particularly waxy lubricating oils.

The thickening action of resinous materials on oils has long been known. In some instances, resins dissolved in oils yield compositions which exhibit improved properties. For example, solutions of some polymeric products in some oils have less change in viscosity with temperature than a similar oil having about the same consistency as the composition but free of such products. Some resinous or polymeric materials raise the pour point of oils in which they are dissolved. Sometimes polymeric materials have no influence on pour point. In other instances, polymeric products depress the pour point. The effect has not been predictable.

We have found by way of specific illustration that polymers of allyl stearate, allyl palmitate, methallyl laurate, allyl octoate, and allyl butyrate do not lower the pour point of lubricating oils when they are dissolved therein. Thus, while polymers of allyl esters of monocarboxylic acids thicken oils in which they are dissolved and in some instances improve viscosity-temperature relations, they are of no economic value in so far as their action in depressing pour points is concerned.

It was, therefore, an unexpected and surprising discoverey to find that some mixtures of allyl esters give copolymers which have a marked influence on pour points of hydrocarbon liquids having waxy pour points. It has been found that when an ester of allyl alcohol and a saturated, aliphatic, monocarboxylic acid having a chain of at least sixteen carbon atoms is copolymerized with an ester of allyl alcohol and a saturated, aliphatic, monocarboxylic acid having four to fourteen carbon atoms within proportions defined below, the resulting copolymers depress the pour point of waxy hydrocarbon liquids at sufficiently low concentrations to give compositions of economic interest.

We have found further that there must be adhered to for practical purposes definite ratios of the two types of monomers for forming the copolymers. At least one mole of the ester of the shorter chained acid must be taken per mole of the ester of the longer chained acid. The upper limit for the proportion of the former ester per mole of the ester of the longer chained carboxylic acid has been found to vary with the length of the carbon chain in the acid portion of the shorter chained ester. Thus, the upper limit is four moles in the case of the ester of allyl or methallyl alcohol and butyric acid and fourteen moles in the case of the comparable ester from myristic acid. For allyl or methallyl caprylate the upper limit is eight moles per mole of ester from the longer chained carboxylic acids. With esters from aliphatic monocarboxylic acids with branched chains, however, the upper limit parallels the number of carbon atoms in the longest single chain of carbon atoms in the acid. Thus, the practical upper limit for allyl or methallyl isobutyrate is three moles per mole of allyl palmitate or stearate. The allyl ester of 2-ethylhexoic acid has essentially the same upper limit as allyl hexoate and methallyl 2-ethylbutyrate has essentially the same upper limit found for methallyl or allyl butyrate.

Thus, in forming copolymers from (a) allyl or methallyl esters of saturated, aliphatic, monocarboxylic acids of four to fourteen carbon atoms, RCOOH, where R is an alkyl group of three to thirteen carbon atoms, and (b) allyl or methallyl esters of saturated, aliphatic, monocarboxylic acids of sixteen to twenty-four carbon atoms, R'COOH, where R' is an alkyl group of fifteen to twenty-three carbon atoms, there must be used at least one mole of the former ester (a) per mole of the latter ester (b) and there may be used as many moles of the former ester (a) as the number of carbon atoms in the longest single chain in the acid portion of this ester.

Carboxylic acid groups here required are those of the relatively shorter chained acids on the one hand and those of the relatively longer chained acids on the other hand. The former include butyric, isobutyric, n-valeric, isovaleric, 2-methylbutanoic, pivalic, caproic, isocaproic, 2-methylpentanoic, 3-methylpentanoic, 2,2-dimethylbutanoic, 2-ethylbutanoic, n-heptoic, caprylic or n-octoic, 2-ethylhexoic, n-nonoic, isononoic, capric, undecanoic, lauric, dineopentylacetic, methyl-tert-butylneopentylacetic, and myristic acids. The relatively longer chained acids include palmitic, margaric, stearic, dicetylacetic, tricosanoic, and tetracosanoic acids.

The allyl or methallyl esters of either class of carboxylic acids may be prepared as pure, individual esters or they may be prepared as mixtures of acids within each class. Thus, the esters may be based on commercial mixtures of fatty acids. Also, there may be mixed two or more allyl esters of monocarboxylic acids of four to fourteen carbon atoms, the limiting portion of this type of ester then being approximately determined by the average carbon chain of this mixture. This mixture is combined with one or more allyl esters of monocarboxylic acids of sixteen to twenty-four carbon atoms and the resulting mixture is copolymerized.

The allyl and methallyl groups have proved to be entirely interchangeable. The α-methyl group of the latter may impart some small advantage to the methallyl group in improving oil solubility. It is an interesting fact, however, that larger α-groups seem to interfere seriously in the practical use of the esters while transposition of the substituent to the β-position apparently again upsets the balance of properties needed to give copolymers with the utility enjoyed by the rather limited group of copolymers here described and claimed.

The preparation of esters of allyl alcohol and these carboxylic acids follows conventional methods. Allyl alcohol and carboxylic acid may be heated together in the presence of an esterification catalyst. A solvent such as toluene or naphtha serves as a solvent and aids in the removal of water of reaction. Where available, acid anhydrides may be used instead of free acids. Another method is based on the use of acid halides. Interchange reactions provide yet another path to the desired esters. The last two methods are of particular interest in the formation of methallyl esters, although other conventional methods may be used for their preparation. The various esters may be purified by distillation, under reduced pressure, where necessary.

The catalysts used for copolymerizing the two types of allyl esters are of the peroxidic type. Typical peroxides are acetyl peroxide, caproyl peroxide, lauroyl peroxide, benzoyl peroxide, dibenzal diperoxide, di-tert-butyl diperphthalate, tert-butyl perbenzoate, 2,2-bis(tert-butyl peroxy)butane, methyl ethyl ketone peroxide, di-tert-butyl peroxide, and tert-butyl hydroperoxide. Temperatures for use of peroxides as catalysts may vary from 75° C. to 160° C. Initial copolymerization may be at a low or moderate temperature and a higher temperature used near completion of copolymerization. This is a desirable procedure to decompose the catalyst. Again, copolymerization may be initiated at relatively higher temperatures and lower temperatures used subsequently.

In the preparation of the copolymers a mixture is made of the two types of allyl esters within the proportions specified above. A polymerization catalyst or a mixture of polymerization catalysts is added, and the mixture copolymerized, usually by heating at 75° C. to 160° C. or higher in an inert atmosphere. It has been found that in order to obtain copolymerization within a practical time the concentration of catalyst must be relatively high. While presence of an organic peroxide at 1% of the weight of the mixture of monomeric esters will start copolymerization, it is generally necessary to use altogether 2% to 12% or more for practical results. A range of 3% to 5% at the start is preferred. Addition of a peroxide in small increments from time to time is particularly helpful in giving a good yield of copolymer in a reasonable time. One peroxide may be used at the start and another added during polymerization. The presence of inert solvents, such as toluene or xylene, usually proves helpful in carrying on the copolymerization. In some cases copolymerization may be performed or completed in the presence of a hydrocarbon oil. Use of an inert atmosphere is very desirable during copolymerization. This may be obtained by flow of a gas, such as nitrogen, or from vapors of a volatile organic solvent.

Some typical procedures for forming the copolymers follow:

(A) There were mixed 133 grams of allyl tetracosanate, 117 grams of allyl laurate, and 12 grams of benzoyl peroxide in a reaction vessel. The air therein was displaced with nitrogen and the charge agitated by the passage of this gas therethrough while the vessel was heated in an oil bath. The temperature was rapidly brought to 95° C. and raised to 114° C. during the next fifteen minutes. Beginning at the end of a two-hour period, five gram batches of benzoyl peroxide were added at hourly intervals until four such additions had been made, while the temperature was held between 110° and 114° C. After this reaction mixture had been heated for seven hours, two grams of benzoyl peroxide was added. After it had been heated for eight hours, the copolymer was dissolved with 470 ml. of toluene and the preparation allowed to cool.

A sample of this preparation was heated in an electric oven at 150° C. under a stream of air. The non-volatile content was thus determined as 38.1%.

When a portion of this preparation was diluted to a content of 30% of copolymer, this solution had a viscosity of six centistokes at 100° F.

The toluene solution can be converted to an oil solution by mixing the solvent solution and a less volatile hydrocarbon fluid, such as a lubricating oil, and stripping off the toluene by heating under reduced pressure.

For instance, 59 grams of the above toluene solution containing 38.1% of copolymer was mixed with 34 grams of a light Mid-Continent lubricating oil. The mixture was heated and toluene taken off. The temperature of 140° C. was held for fifteen minutes at 15 mm. pressure and then for 30 minutes at one mm. This concentrate in oil was a waxy mass in the cold, containing 37.5% of copolymer. It was used as a concentrated additive in various waxy oils and found to cause substantial depression of the pour point thereof.

The procedure described above was repeated with a mixture of allyl tetracosanate and allyl laurate in a molar proportion of 1 to 5. The copolymerization was started with 2% of benzoyl peroxide based on the weight of the esters. Added increments brought the final weight of peroxide to 10%. Temperatures of polymerization were maintained between 115° C. at the start and 103° C. at the end of eight hours. A yield of 100% of copolymer was obtained.

In the same way there are prepared copolymers of allyl tetracosanate with allyl butyrate, isobutyrate, 2-ethylhexoate, or octoate, or other allyl monocarboxylate of four to fourteen carbon atoms. Corresponding methallyl esters are similarly prepared and possess the same utility in lubricating oils.

(B) A mixture was made of 162 grams of allyl stearate, 120 grams of allyl laurate, and 10 grams of technical lauroyl peroxide. About 35 grams of this mixture was run into a reaction flask which was swept out which nitrogen and heated in an oil bath at 110° C. Within five minutes copolymerization was taking place. At ten minute intervals lots of about 17.5 grams each of the mixture were run in while the temperature was held between 109° and 113° C. At the end of three hours and hourly thereafter until seven hours had passed, half gram batches of lauroyl peroxide were added. After seven and three fourths hours the product was taken up in 250 grams of toluene. Analysis of the product showed a copolymer yield of 93.4%.

When this concentrate was reduced to 30% solution of copolymer in toluene, a viscosity of 8 cs. at 100° F. was formed therefor. A portion of the copolymer solution was mixed with a light lubricating oil and heated to drive off toluene. The solution was stripped for an hour at 140° C./25 mm. to 4 mm. to give a concentrate 37.2% of copolymer. This concentrate was useful for addition to lubricating oils having waxy pour points.

(C) A mixture of 25 grams of methallyl stearate, 25 grams of methallyl laurate, and 2.5 grams of benzoyl peroxide was heated under a nitrogen atmosphere in a vessel in an oil bath at about 100° C. Additions of benzoyl peroxide were made from time to time as follows: after two hours, 1 gram; after three hours, 2.5 grams; after four and one half hours, 1 gram; after five and one half hours, 0.4 gram; after six and one half hours 0.2 gram. After eight hours of heating the batch was taken up in 52 grams of toluene. Yield of copolymer was determined as 91.3%. This copolymer was found effective as a pour point depressant in waxy petroleum products.

(D) The procedure used above was followed with a mixture of 121 grams of allyl palmitate and 79 grams of allyl butyrate. The copolymerization was started with 10 grams of tert-butyl perbenzoate at about 115° C. and during the course of eight and a half hours twenty grams of additional perbenzoate were added. The copolymer was taken up in toluene to give a 31% solution thereof.

The same procedure may be used for preparing copolymers of allyl palmitate with such esters as allyl isobutyrate, allyl 2-ethylbutyrate, allyl isononate, allyl laurate, or allyl myristate or the corresponding methallyl esters.

(E) A mixture of 50 grams of methallyl stearate and 150 grams of allyl laurate was treated with 10 grams of benzoyl peroxide and subjected to copolymerization at 109° to 116° C. during the course of eight hours. Increments of the peroxide added from time to time totaled 20 grams. The yield of copolymer was 95.3% of theory. This copolymer was an effective pour point depressant when dissolved in waxy hydrocarbon oils.

(F) A mixture of 54 grams of allyl stearate and 132 grams of methallyl octoate was treated with five grams of tert-butyl perbenzoate and heated under a stream of nitrogen at 90° to 100° C. After two hours five grams of tert-butyl hydroperoxide was added and the temperature raised to 130° C. At the end of hourly periods thereafter up to the seventh hour two gram portions of the latter peroxide were added. The temperature was then carried to about 150° C. The batch was allowed to cool and taken up in toluene during the cooling period. A solution containing 30% of copolymer was thus prepared. The solution had a viscosity of 3.2 cs. at 100° F.

Another method of preparing copolymers which are soluble in lubricating oils and effective in depressing waxy pour points is based upon acidolysis of the polymer of allyl acetate or other carboxylate of a readily volatilized acid. The polyallyl acetate is heated with a mixture of stearic acid, as a typical long-chained acid, and an aliphatic saturated monocarboxylic acid of four to fourteen carbon atoms, the two types of acid being in the prescribed proportions. Acetic acid is replaced under the influence of a small amount of an acidic catalyst, such as p-toluene sulfonic acid, and volatilized.

The size of the copolymer unit for the purposes of this invention may vary from about 500 to over 5,000 in average molecular weight. When the defined allyl and/or methallyl esters of relatively large (A) and relatively small (B) monocarboxylic acids are copolymerized within the prescribed proportions, the resulting copolymers give definite lowering of the pour points of wax-containing hydrocarbon liquids. The thickening action in general becomes greater with increase in molecular size and if this is desired in connection with depression of pour point, the upper range of molecular size should be used. The copolymers of relatively large molecular weight raise the viscosity index of oils.

In the case of a copolymer from one mole of allyl stearate and one mole of allyl 2-ethylhexoate a 30% solution in toluene gave a viscosity of 71 cs. at 100° F. This copolymer gave a marked depression of a Pennsylvania lubricating oil, dropping the pour point from +25° F. to −30° F. at 0.5% and depressing the pour point even at a concentration of 0.04%. This copolymer at 0.5% in a Pennsylvania oil raised the viscosity index to 112 from 105.

A copolymer from 63.8 grams of allyl stearate and 36.2 grams of allyl 2-ethylhexoate was carried to a molecular size which imparted to a 30% solution thereof in toluene a viscosity of 3.9 cs. at 100° F. At 0.5% of this copolymer in a light Pennsylvania lubricating oil having a normal pour point of +25° F. a depression of the pour point −30° F. was obtained. The viscosity of this solution was 5.234 cs. at 210° F. and 31.71 cs. at 100° F. Its viscosity index is 105.5. The original oil has a viscosity index of 105.

The copolymers are useful for the preparation of lubricating compositions and the like. For this purpose, the copolymer itself or a solution thereof, as in an oil or in a volatile solvent, is taken up in a hydrocarbon fluid having a waxy pour point. The concentration of the defined copolymers may be in the most favorable combinations as low as 0.01% and still have a definite influence on the pour point. In cases where depression of pour point is desired along with thickening action and/or improvement in the viscosity index, concentrations as high as 5% may be taken. In the usual lubricating oil or fuel oil having a waxy pour point, concentrations of about 0.05% to 1% are most desirable.

While the data given thus far have borne directly on depressing the pour point of lubricating oils having a waxy pour point, the action of the new copolymers which are herein defined is not confined to lubricating oils. It extends to fuel oils and diesel fuels which have waxy pour points. A few tenths per cent of one of the defined copolymers causes a definite depression of the pour point thereof and lessens the tendency of these normally liquid petroleum hydrocarbons to congeal in the cold, then not being capable of flowing or of being pumped. Fuel oils and diesel fuels containing the copolymers are not altered in their burning properties. The presence of the copolymer in lubricating oils does not interfere with their normal functioning and definitely improves oils as to pour point and often as to viscosity index.

The action of the copolymers of this invention was determined by dissolving them in three different oils and submitting the resulting solutions to pour point tests. The standard A. S. T. M. pour test (D97—47) was generally used and this was supplemented with maximum pour tests and shock chilling in some cases. The maximum pour test is described in Proc. A. S. T. M. 45, Appendix I, p. 244 (1945). The shock chilling determination is made by observing the samples during the initial cooling step with the cooling jacket at —60° F.

The first of the oils used for testing was (I) a 150 Pennsylvania neutral having a pour point of +25° F. The tests showed this oil to be relatively sensitive to the action of pour point depressants. The second oil (II) used for testing was a 500 Mid-Continent solvent-extracted neutral (SAE-30) with a pour point of +25° F. This was known to be an oil which was not readily changed as to its pour point. A third oil used was an SAE-90 gear oil (III), compounded from 30 parts of a 180 Pennsylvania neutral and 70 parts of a 150 Pennsylvania bright stock, having a pour point of +25° F. The response of these oils to various copolymers is set forth in the following examples.

Example 1

(a) A copolymer was prepared from one mole of allyl stearate and one mole of allyl butyrate with a molecular weight of about 2000. At 0.5% and at 0.25% in Oil I the A. S. T. M. pour point was 0° F.

(b) A copolymer prepared from one mole of allyl stearate and 1.5 moles of allyl butyrate (about 3000 molecular weight) was dissolved in Oil I. The pour point was depressed to —5° F. at concentration of this copolymer of 0.5% and 0.25%. In Oil III at 0.1% of this copolymer the pour point was 0° F.

(c) A copolymer from one mole of allyl stearate and 3.09 moles of allyl butyrate (average molecular weight about 1000) was dissolved in Oil I. A 0.5% solution had a pour point of —5° F., while 0.25% solution had a pour point of 0° F.

(d) A copolymer from one mole of allyl stearate and four moles of allyl butyrate, dissolved in Oil I, caused the pour point to be 0° F. at 0.5% and +5° F. at 0.25%.

A copolymer from one mole of allyl stearate and five moles of allyl butyrate caused the pour point to be +30° F. when this copolymer was used at 0.5% in Oil I.

Example 2

(a) A copolymer was prepared from one mole of allyl stearate and one mole of allyl isobutyrate. It was tested in Oil I at 0.5% and found to change the pour point to +5° F. In Oil II at 0.5% it changed the pour point to +15° F.

(b) A copolymer from one mole of allyl stearate and two moles of allyl isobutyrate depressed the pour point of Oil I to —10° F. at a concentration of 0.5%.

(c) A copolymer from one mole of allyl stearate and three moles of allyl isobutyrate depressed the pour point to —5° F. at 0.5% and to +15° F. at 0.25% when dissolved in Oil I.

Copolymers prepared from one mole of allyl stearate and four and five moles respectively of allyl isobutyrate fail to act as pour point depressants and in some oils actually raise the pour point.

Example 3

A copolymer was prepared from one mole of allyl stearate and one mole of allyl 2-ethylhexoate. In Oil I it gave pour points of —30° F., —10° F., and +5° F. at 0.5%, 0.25% and 0.1% respectively. An allyl 2-hexoate polymer in the same oil gave pour points of +30° F. and +25° F. at 0.5% and 0.25% respectively. With the polymer of the pure allyl stearate dissolved in Oil I a pour point of +25° F. was observed at concentrations varying from 0.5% to 0.04% of the polymer. The polymer of allyl 2-ethylhexoate likewise failed to depress the pour point of this oil. A mechanical mixture in a molar ratio of 1:1 also failed to depress the pour point.

Example 4

(a) A copolymer was prepared from one mole of allyl stearate and about four moles of allyl isononoate (the allyl ester of a mixture of acids derived from the reaction product of carbon monoxide and hydrogen on diisobutylene). With 0.5% of this copolymer dissolved in Oil II the pour point was +15° F. and at 0.1% of this copolymer in Oil III the pour point was +20° F.

(b) A copolymer was prepared from one mole of allyl stearate and 1.5 moles of the same allyl isononoate. At 0.5% in Oil II it gave a pour test of —20° F. In Oil I at 0.5% it gave a pour point of —5° F.

Example 5

(a) A copolymer was made with one mole of allyl stearate and two moles of allyl laurate. Pour points of —10° F. were observed at 0.1% and 0.25% of this copolymer in Oil I, of 0° F. at 0.1% in Oil III, and of —15° F. at 0.5% in Oil II.

(b) A copolymer from one mole of allyl stearate and seven moles of allyl laurate gave pour points of —20° F. at 0.25% in Oil I, and —15° F. at 0.5% in Oil II.

(c) A copolymer from one mole of allyl stearate and twelve moles of allyl laurate gave pour points of —5° F. by the maximum pour test at 0.5% in Oil II, and —15° F. at 0.1% in Oil I. The polymer of pure allyl laurate dissolved at 0.5% in Oil III gave a pour point of +25° F., thus producing no depression of pour point.

(d) A copolymer from one mole of allyl stearate and six moles of allyl laurate imparted to a 30% solution of the copolymer in toluene a viscosity of 3.9 cs. at 100° F. A 1% solution of this polymer in Oil I had a pour point of —15° F. The viscosity of this 1% solution was 5.249 at 210° F. and 31.69 cs. at 100° F., giving a viscosity index of 106.7. A 2% solution gave a pour point of —20° F., viscosities of 5.290 at 210° F. and 32.00 at 100° F., and a viscosity index of 107.2. A 5% solution gave a pour point of —15° F., viscosities of 5.471 at 210° F. and 33.17 cs. at 100° F., and a viscosity index of 110.9.

Example 6

(a) A copolymer was prepared from one mole of allyl stearate and 1.5 moles of allyl myristate. At 0.1% in Oil I the pour point was —5° F., at 0.5% in Oil II was 0° F., and at 0.1% in Oil III was 5° F.

(b) A copolymer from one mole of allyl stearate and six moles of allyl myristate gave pour points of —5° F., at 0.1%, 0.25% and 0.5% in Oil I, gave a pour point of 0° F. in Oil II, and gave a pour point of 10° F. at 0.1% in Oil III.

Example 7

A copolymer was prepared from one mole of methallyl stearate and 1.5 moles of allyl 2-ethylhexoate. In Oil I at 0.5% it gave a pour point of 5° F. Under shock chilling in Oil II at 0.5% it gave a pour point of 15° F.

Example 8

A copolymer from one mole of methallyl stearate and four moles of allyl laurate gave a pour point of −20° F. at 0.5% in Oil I and −15° F. at 0.5% in Oil I. Polymethallyl stearate in these oils did not depress the pour points thereof.

Example 9

A copolymer was prepared from one mole of methallyl stearate and 1.3 moles of methallyl laurate. It gave pour points of −15° F. at 0.5% and 0.25% in Oil I and of −5° F. in Oil II at 0.5%. Polymethallyl laurate dissolved in these oils failed to depress the pour points thereof.

Example 10

A copolymer was prepared from one mole of allyl palmitate and 1.5 moles of allyl laurate. At 0.5% in Oil I and again at 0.25% in Oil I the pour point was depressed to −5° F. In Oil II at 0.5% the pour point was −5° F. At 0.04% in Oil III the pour point was +20° F.

Example 11

A copolymer was prepared from one mole of allyl palmitate and four moles of allyl laurate. At concentrations of 0.1% to 0.5% in Oil I this copolymer depressed the pour point to −10° F. In Oil II at 0.5% it gave a pour point of −5° F. In Oil III at 0.1% it gave a pour point of +5° F.

Example 12

A copolymer was prepared from one mole of allyl tetracosanate and 1.5 moles of allyl butyrate. At 0.1% in Oil III it gave a pour point of +15° F. and of +20° F. at 0.04%. Polyallyl tetracosanate by itself does not lower the pour point of this oil.

Example 13

(a) A copolymer from one mole of allyl tetracosanate and four moles of allyl laurate gave pour points of −10° F. and 0° F. at 0.5% and 0.1% respectively in Oil I.

(b) A copolymer from one mole of allyl tetracosanate and five moles of allyl laurate gave pour points of −20° F. and 0° F. at 0.5% and 0.1% respectively in Oil I.

The copolymers of this invention are new materials. They are oil-soluble and impart to solutions thereof increases in viscosity which depend in part upon the molecular size of the copolymers. They are particularly useful in petroleum hydrocarbons from paraffinic or naphthenic stocks and which have waxy pour points. These copolymers effectively depress such pour points at low to moderate concentrations thereof. They are relatively stable copolymers for this purpose and may be used in conjunction with many other kinds of petroleum additives, such as antioxidants, wear-resisting agents, oiliness agents, detergents and the like.

We claim:

1. A copolymer of (A) an ester of a saturated aliphatic monocarboxylic acid of sixteen to twenty-four carbon atoms, R'COOH, and an alcohol selected from the class consisting of allyl alcohol and methallyl alcohol and (B) an ester of a saturated aliphatic monocarboxylic acid of four to fourteen carbon atoms, RCOOH, and an alcohol selected from the class consisting of allyl alcohol and methallyl alcohol, the proportion of the first ester (A) to the second (B) being defined by ratios from one mole of the first to one mole of the second up to one mole of the first to a number of moles of the second equal to the number of carbon atoms in the longest chain of carbon atoms in the monocarboxylic acid portion of said ester, R' in the above formula representing an alkyl chain of fifteen to twenty-three carbon atoms and R representing an alkyl group of three to thirteen carbon atoms.

2. A copolymer of (A) allyl stearate and (B) allyl laurate, wherein the proportion of allyl stearate to allyl laurate is within the ratios of one to one and one to twelve.

3. A copolymer of (A) methallyl stearate and (B) allyl laurate, wherein the proportion of methallyl stearate to allyl laurate is within the ratios of one to one and one to twelve.

4. A copolymer of (A) allyl stearate and (B) allyl 2-ethylhexoate, wherein the proportion of allyl stearate to allyl 2-ethylhexoate is within the ratios of one to one and one to six.

HARRY T. NEHER.
LA VERNE N. BAUER.
WILLIAM L. VAN HORNE.

REFERENCES CITED

The following references are of record in the file of this patent:

UNITED STATES PATENTS

| Number | Name | Date |
|---|---|---|
| 2,424,838 | Moffett | July 29, 1947 |
| 2,441,023 | Larsen | May 4, 1948 |

FOREIGN PATENTS

| Number | Country | Date |
|---|---|---|
| 395,478 | Great Britain | July 20, 1933 |

OTHER REFERENCES

"Allyl Alcohol," Shell Devel., 1946; pages 27 to 31 pertinent.